Figure 1:
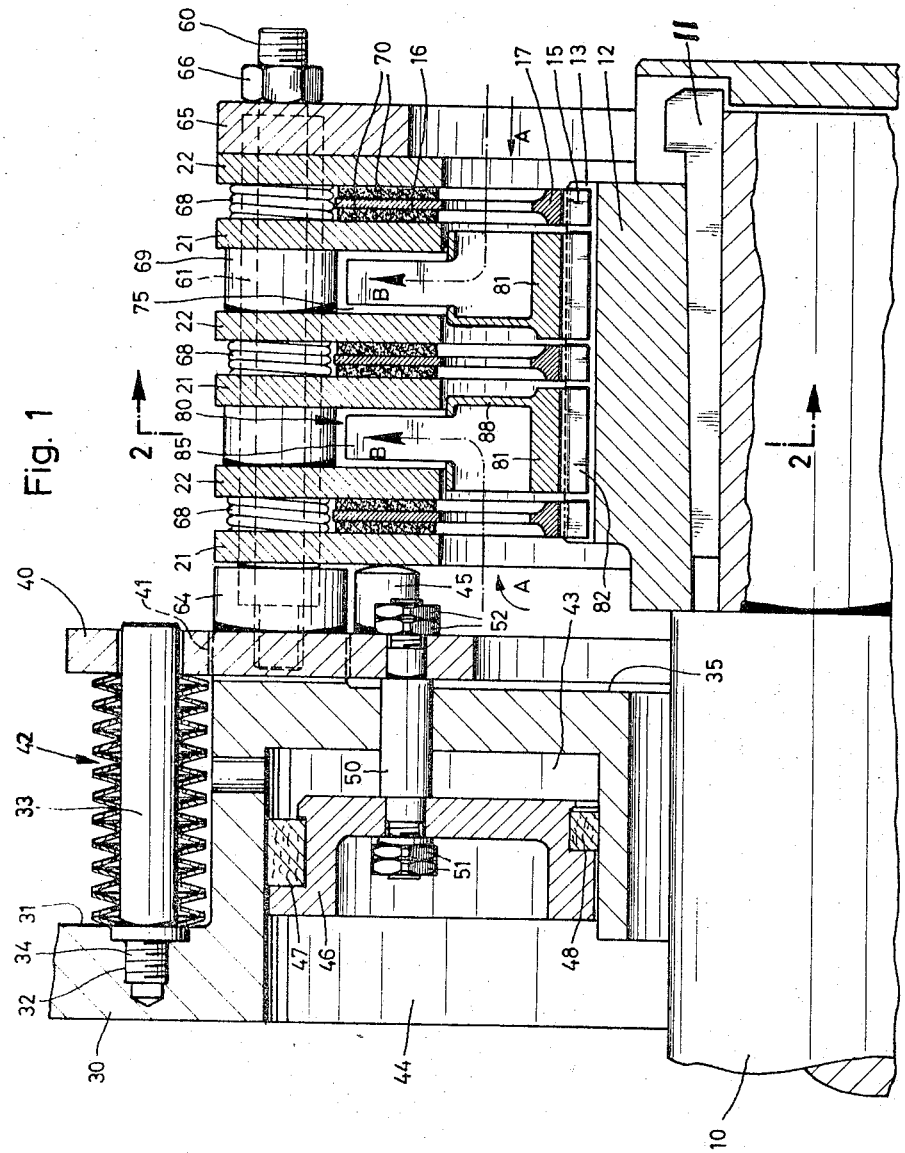

Aug. 15, 1967   HORST-EGON WACH   3,335,834
COUPLING WITH AIR COOLED FRICTION DISCS
Filed May 17, 1965                         2 Sheets-Sheet 1

Inventor:
HORST-EGON WACH
By: Molte & Molte
ATTORNEYS

Aug. 15, 1967    HORST-EGON WACH    3,335,834
COUPLING WITH AIR COOLED FRICTION DISCS
Filed May 17, 1965                    2 Sheets-Sheet 2

Inventor:
HORST-EGON WACH
By: Holte & Holte
ATTORNEYS.

United States Patent Office 3,335,834
Patented Aug. 15, 1967

3,335,834
COUPLING WITH AIR COOLED
FRICTION DISCS
Horst-Egon Wach, Waldstetten, Germany, assignor to
May-Pressenbau G.m.b.H., Strassdorf, Germany
Filed May 17, 1965, Ser. No. 456,291
Claims priority, application Germany, May 27, 1964,
M 61,143
4 Claims. (Cl. 192—69)

The present invention relates to friction assemblies.

In particular, the present invention relates to friction assemblies of the disc type, these assemblies being designed either to transmit power when they act as a clutch or to stop the rotation of a shaft or the like when they act as a brake. Thus, the term "friction assembly" is intended to refer to an assembly which can act either as a brake or a clutch. The only difference between the brake and clutch structure is that in the case of a brake the rotary element has the discs connected therewith engaged by discs which cannot rotate while in the case of a clutch both sets of discs can rotate so that the power can be transmitted.

It is already known, in friction assemblies of this type, to provide a relatively large number of inner discs which, for example, are mounted on a drive shaft for axial movement therealong, while being constrained to rotate with the drive shaft. A plurality of outer discs extend between and partly overlap the inner discs so as to frictionally engage the latter. These outer discs are also coaxial with the drive shaft and movable along the axis thereof while being prevented from rotating, in the case where the friction assembly has the construction of a brake. In the operating condition of the friction assembly a spring means urges the outer discs frictionally against the inner discs. A suitable actuating device is provided to overcome the force of the latter spring means so that the brake is released or the clutch is released.

During frequent actuation of the clutch or brake there will be a considerable amount of heat generated, and therefore a relatively large number of actuations in a short period of time is only possible either if the structure is so designed that it will accept a high temperature of frictional rubbing or if the structure is designed to efficiently carry away the generated heat. With known friction assemblies of this type, heat is carried away solely by convection, insofar as the discs themselves do not provide a certain circulation or movement of air. This manner of carrying away the heat, however, results in only a small reduction in the temperature, so that either care must be taken not to actuate the structure too often, or the structure must be made of a sufficiently large size to take into account the generated heat.

It is a primary object of the present invention to provide a friction assembly of the above type which has the capability of carrying away heat in a manner which is far superior to what has heretofore been possible with any known friction assemblies of this type.

In particular, it is an object of the present invention to provide an arrangement of the inner and outer discs of the friction assembly in such a way that they will promote efficient cooling of the assembly, so that in this way a large number of actuations of the assembly in a short period of time is feasible and on the other hand the entire assembly can be made correspondingly smaller because of its high efficiency in carrying away the generated heat.

Thus, with the structure of the invention, because of the relatively low temperature at which the structure operates, the life of the friction layers which directly sustain the frictional rubbing is greatly increased and, in fact, the output of the assembly can be increased.

However, a still further object of the present invention involves the provision of a structure of the above type which includes a means for positively moving the air in the region of the friction assembly so as to promote the maintenance of relatively low operating temperatures.

In particular, it is an object of the present invention to provide a structure capable of moving air first along the axis of the assembly and then radially away from this axis so as to provide a highly efficient cooling.

Thus, the objects of the present invention include the provision of a friction assembly which will have a highly favorable air circulation.

Primarily, the structure of the present invention includes a set of inner discs which are arranged along and surround a predetermined axis, and a set of outer discs which overlap the inner discs and extend outwardly beyond the inner discs. A means is provided to support both sets of discs for movement along their common axis, while this means supports at least one of the sets of discs for rotation about the common axis thereof. In accordance with a particular feature of the present invention the numerical ratio between at least some of the inner discs and the outer discs which cooperate therewith is such that there are two outer discs for each of these inner discs, so that a pair of outer discs are provided for respectively engaging the opposed faces of each of the inner discs. Also, these pairs of outer discs are axially spaced from each other, so that between each pair of successive adjoining inner discs, to which this numerical ratio of the invention applies, there are two outer discs which are axially spaced from each other. In this way the sets of discs have, with respect to each other, a spacing which strongly promotes a highly efficient cooling of the friction assembly.

However, in order to further promote this cooling, the invention also includes the provision of a blower means operatively connected with that set of discs which rotates about the common axis and includes blower wheels which respectively communicate with the spaces defined between the pairs of successive outer discs, these latter spaces of course being the spaces between the two outer discs which are situated between each pair of successive adjoining inner discs. The blower wheels of the blower means are designed so as to draw air along the common axis of the sets of discs and then discharge it radially away from this axis out through the spaces between the sets of two outer discs which are respectively situated between the successive pairs of adjoining inner discs.

Figure 2:
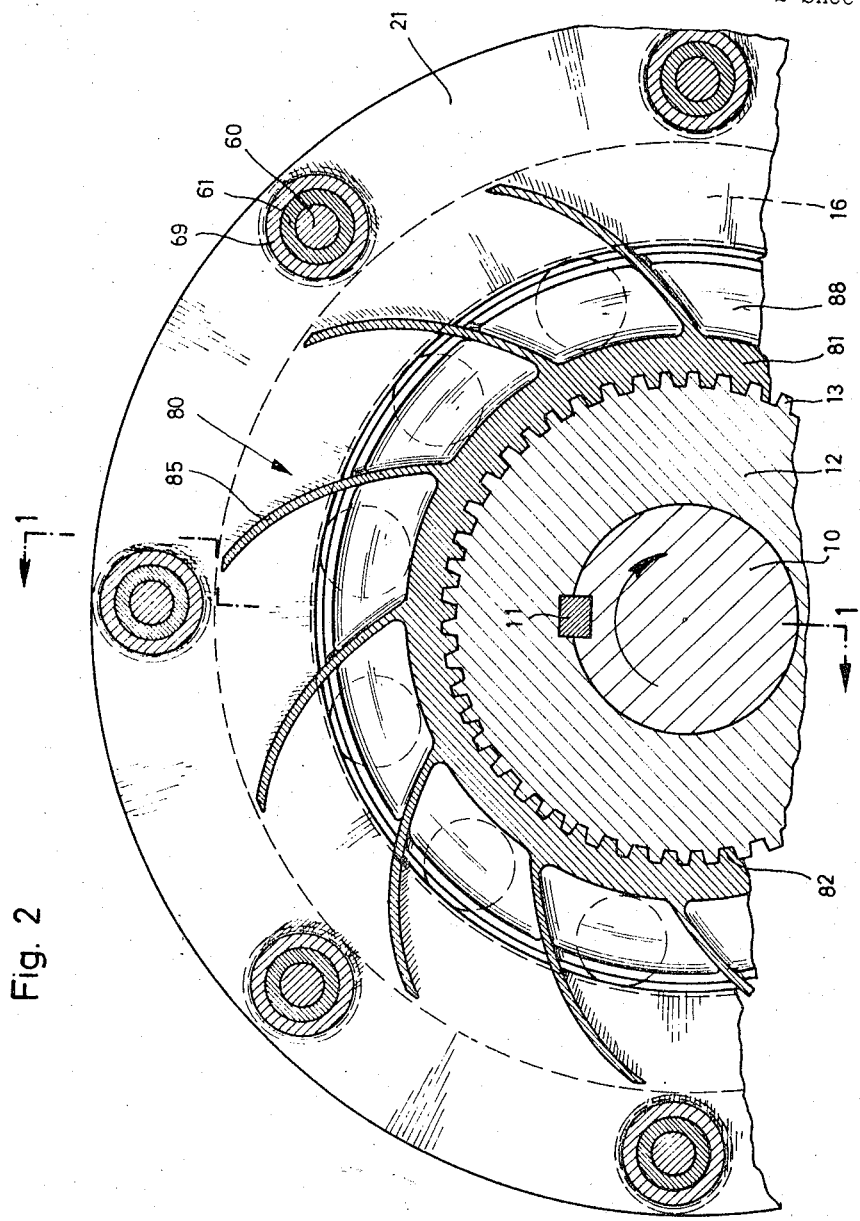

The invention is illustrated by way of example in the accompanying drawings which form part of the application and in which:

FIG. 1 is a longitudinal sectional elevation fragmentarily illustrating one possible embodiment of a structure according to the present invention as applied to a brake; and FIG. 2 is a fragmentary transverse sectional view taken along line 2—2 of FIG. 1 in the direction of the arrows.

Referring now to the drawings, a drive shaft 10 which is fragmentarily illustrated therein is supported for rotation about its axis and is drive from any suitable engine or the like. A key 11 serves to fixedly mount on the drive shaft 10 a hub 12 which supports the inner discs of the disc-type of brake which forms the friction assembly shown in the particular example of FIG. 1. As is particularly apparent from FIG. 2, the hub 12 is provided with a relatively large number of axially extending teeth or splines 13 which of course form corresponding tooth gaps between themselves. The teeth 15 of the inner discs 16 are respectively received in these tooth gaps, these teeth 15 being integral with and projecting inwardly from the hub 17 of the inner discs 16, respectively. In this way the hub 12 forms a means for mounting the inner discs for rotation together with the shaft 10 while at the same time these inner discs are capable of moving axially with respect to the shaft 10 along the axis thereof which is common with the axis of the several discs 16. Each disc 16 includes at its opposed faces a pair of friction rings 70 permanently fixed with each disc 16 and made of a suitable composition which has the required high coefficient of friction, as is well known in the art.

A plurality of outer discs 21, 22 are respectively arranged along and surround the axis of the shaft 10, and these outer discs 21, 22 radially overlap the inner discs while extending outwardly beyond the latter. In accordance with the present invention at least some of the inner discs have a predetermined numerical ratio with respect to the outer discs, and this numerical ratio of the present invention is shown for all three of the inner discs 16 in the particular example illustrated in FIG. 1. Thus, it will be seen that according to the present invention two outer discs 21 and 22 are provided for each inner disc 16, so that a pair of outer discs 21 and 22 are respectively adapted to engage the opposed faces of each inner disc 16, these opposed faces of course being formed by the exterior surfaces of the friction rings 70. The manner in which the outer discs 21, 22 are mounted is described in connection with the structure for actuating the disc-type brake shown in the drawings. However, since a brake is shown in the illustrated example, it will be understood that the structure for mounting the outer discs 21, 22 necessarily includes a means for supporting these discs for free movement along the axis which they have in common with the inner discs 16 while at the same time preventing rotation of the discs 21, 22, so that when the rotating discs 16 are pressed against by the non-rotating discs 21, 22 the brake will act to stop rotation of the shaft 10. Of course, in the case of a clutch the means for supporting the discs 21, 22 would support them for rotation about the axis of the shaft 10 as well as for free movement along this axis, and in this case, the outer discs would be connected to the driven means so as to be non-rotatable with respect thereto. In this way the drive would be transmitted by the clutch from the shaft 10 to the driven part by frictional engagement of the discs 16 with the outer discs 21, 22.

In the illustrated example the structure for actuating the outer discs includes a support 30 which has at its right side face 31, as viewed in FIG. 1, a plurality of threaded bores 32 which receive the threaded portions 34 of the elongated guide pins 33 which are uniformly distributed about the axis of the shaft 10 and which extend parallel thereto.

The guide pins 33 extend with clearance through a motion-transmitting plate 40 in the form of a ring surrounding the shaft 10 and spaced therefrom, and each guide pin 33 carries a spring means 42 which acts on the plate 40 so as to urge the latter to the right, as viewed in FIG. 1. Of course the spring means 42 is composed of a plurality of dished spring elements arranged as shown in FIG. 1 and concentrically surrounding the guide pin 33. The motion-transmitting plate 40 fixedly carries at its right face, as viewed in FIG. 1, a plurality of pressure pins 45 which directly engage the left outer disc 21 of FIG. 1.

The support 30 extends with clearance around the shaft 10 and is formed with annular channel 44 which also surrounds the shaft 10 while being spaced therefrom. This channel 44 slidably receives an annular piston 46 provided with sealing rings 47 and 48 slidably engaging the outer and inner cylindrical surfaces of the channel 44 so as to provide a fluid-tight slidability of the piston 46 in the channel 44. Between the piston 46 and the right wall of the support 30, which forms the end wall of the channel 44, there is, therefore, an annular chamber 43. The piston 46 is fixed by a plurality of axially extending pins 50 with the motion-transmitting plate 40, so that the piston 46 and the plate 40 move together. The construction is such that the central portion of each pin 50 has a pair of shoulders respectively engaging the piston 46 and the plate 40, and the portions of smaller diameter at the ends of each pin 50 extend through suitable openings of the piston 46 and the plate 40 and carry the nuts 51 and 52 so that in this way the piston 46 and the plate 40 are rigidly fixed to each other. The pins 50 can slide freely and in a fluid-tight manner through the openings in the right end wall of the channel 44 during movement of the piston 46 and the plate 40 along the axis of the shaft 10.

The right end surface 35 of the support 30 has fixedly mounted thereon a plurality of axially extending projections 64 which may be integral with the support 30 and which are uniformly distributed about the axis of the shaft 10, and these projections 64 respectively extend freely through openings 41 in the plate 40 so that the latter is freely movable with respect to the projections 64. These projections 64 are respectively formed with threaded bores which receive one of the threaded ends of a plurality of elongated threaded studs 60 which extend parallel to and are uniformly distributed about the shaft 10, as is particularly apparent from FIG. 2. These threaded studs 60 which are thus fixedly carried by the projections 64 extend through guide sleeves 61, respectively, and it will be noted that the left ends of these guide sleeves 61 extend into the bores of the projections 64 to engage shoulders therein.

Thus, the guide sleeves 61 are received in the blind bores of the projections 64. The studs 60 together with the guide sleeves 61 extend through corresponding openings in the outer discs 21, 22 in such a way that these outer discs are freely movable along the guide sleeves 61. In order to limit the axial movement of the outer discs 21, 22 the right ends of the threaded studs 60 carry a stop plate 65 the position of which is determined by the nuts 66 carried by the right threaded ends of the studs 60, as viewed in FIG. 1. Thus, the nuts 66 limit the movement of the stop plate 65 to the right, as viewed in FIG. 1, and this stop plate may itself be formed with enlarged bore portions for receiving the right ends of the guide sleeve 61, as is apparent from FIG. 1.

A spring means is provided for urging each pair of discs 21, 22 apart from each other, and this spring means takes the form of the several coil springs 68 which are relatively weak and which can exert only a fraction of the force exerted by the spring means 42, so that the springs 68 can urge the several pairs of outer discs 21, 22 apart from each other only when the spring means 42 does not act on the outer discs.

Between the discs 21, 22, which are situated between each pair of successive adjoining discs, 16, spacer sleeves 69 are arranged on the guide sleeve 61. It is to be noted that with the structure of the present invention the pairs of discs 21, 22 which respectively cooperate with the several inner discs 16 are axially spaced from each other so that the two outer discs which are situated between each pair of successive adjoining inner discs 16 define between themselves a space 75.

As a result of this construction, the sets of inner and outer discs have with respect to each other a relationship which promotes the free movement of air throughout the entire assembly, and thus a highly efficient cooling will take place.

However, in order to further promote the cooling of the assembly, a blower means 80 is provided for blowing air first along the axis of the shaft 10 through the discs and then radially out through the spaces 75, as indicated by the dot-dash line arrows B in FIG. 1. This blower means 80 includes blower wheels respectively communicating with the spaces 75, and it will be seen that in the illustrated example there are a pair of spaces 75 so that there is a pair of blower wheels. These wheels are provided with hubs 81, respectively, which have the teeth 82 extending into the gaps between the splines 13, so that the blower wheels themselves are constrained to rotate with the shaft 10 while being axially movable therealong.

As is shown particularly in FIG. 2, each blower wheel includes a plurality of spirally extending vanes 85. Moreover, as may be seen from FIG. 1, each blower wheel has an end wall 88, and with the arrangement shown in FIG. 1 the pair of end walls 88 of the pair of illustrated blower wheels are directed toward each other. Opposed to these end walls 88 the blower wheels are provided with inlet openings enabling the air to be sucked into the spaces between the vanes. Thus, the outer ends of the blower wheels shown in FIG. 1 are respectively formed with annular gaps into which the air can be drawn in the direction of the arrows A through suitable openings formed in the discs themselves as well as in the support means therefor and into the interior of the spaces between the vanes 85 so as to be discharged under pressure outwardly through the spaces 75.

With the structure described above, when the brake is in its rest position, the outer discs are pressed against the inner discs by the spring means 42 and thus the pressure of this spring means acts through the motion-transmitting plate 40 on the pressure pins 45 to press the left outer disc 21 to the right, as viewed in FIG. 1, thus causing all of the discs to frictionally engage each other and in this way the brake is engaged. The releasing of the brake is brought about by applying, in a well known manner, a fluid under pressure in the interior of the chamber 43 acting on the piston 46 to advance the latter to the left, as viewed in FIG. 1, so that in this way the plate 40 will be drawn to the left in opposition to the spring means 42, and now the springs 68 will be capable of urging the pairs of outer discs 21, 22 apart from each other so as to release the pressure with which these discs engage the inner discs 16, and this way the brake is released.

The cooling action, in addition to being provided by the arrangement of the discs themselves, is also provided by the blower means 80 which directs the air in the direction of the arrows A and B, as indicated above. In this way there is a highly favorable cooling of the entire inner portion of the brake assembly, and also there is a particularly good cooling of the outer discs between which the air flows to the exterior of the assembly in the manner described above.

Of course, with the blower wheels of the invention the air can be driven outwardly either in a direction which is purely radial with respect to the axis of the shaft 10 or in a direction which is inclined to a purely radial direction. The blower wheels suck the air in opposite directions, as indicated by the arrows A, into the interiors of the blower wheels so as to then discharge the air outwardly through the spaces 75. The arrangement shown in FIG. 1 is particularly suitable where only two blower wheels are provided, since in this way the air can be drawn in opposite directions along the axis of the shaft 10 before being driven outwardly away from this axis. It is particularly to be noted that the vanes 85 extend inwardly all the way up to the hub 81 of each blower wheel which has the teeth 82 extending into the gaps between the teeth 13.

What is claimed is:

1. A friction assembly comprising; a set of inner discs surrounding and distributed along a common axis and a set of outer discs also surrounding and distributed along said axis, said outer discs radially overlapping and extending outwardly beyond said inner discs, means mounting both sets of discs for movement along said axis and at least one of said sets of discs for rotation about said axis, the numerical ratio between at least some of said inner discs and the outer discs cooperating therewith being two outer discs for each inner disc arranged respectively on opposed sides of and adapted to frictionally engage each inner disc so that a pair of outer discs are provided for each of said inner discs to which said numerical ratio applies, said pairs of outer discs being axially spaced from each other so that between each pair of successive inner discs to which said numerical ratio applies there are two axially spaced outer discs, means cooperating with said outer discs for pressing the latter against said inner discs and for releasing the pressure of said outer discs against said inner discs, and blower means operatively connected to that one of said sets of discs which rotates about said axis for rotation therewith, said blower means including a plurality of blower wheels, and the two axially spaced outer discs situated between each of said pairs of successive inner discs defining between themselves a space which receives one of said blower wheels, said blower means directing air first axially and then radially with respect to said axis, and each of said blower wheels having an axially extending suction passage and a substantially radially extending discharge passage, said means for mounting both sets of discs for movement along said axis including for said outer discs a plurality of elongated supporting assemblies extending parallel to said common axis through said outer discs and being uniformly distributed about said common axis to leave free angular portions of said outer discs situated between said elongated supporting assemblies.

2. A friction assembly as recited in claim 1 and wherein said means for mounting both sets of discs includes for said inner discs a shaft extending along said common axis and carrying said inner discs, said blower wheels being operatively connected to said shaft for rotation therewith and each blower wheel having a hub extending around and operatively connected with said shaft and including vanes which extend all the way up to said hub.

3. A friction assembly as recited in claim 2 and wherein said means for mounting said outer discs including spacers situated between said outer discs and circumferentially spaced from each other to provide for free movement of air by said blower means.

4. A friction assembly as recited in claim 1 and wherein each of said blower wheels has an end formed with a gap through which air can enter into said blower wheel.

References Cited

UNITED STATES PATENTS

| | | | |
|---|---|---|---|
| 2,076,538 | 5/1937 | Bendit | 188—264 X |
| 2,182,387 | 12/1939 | Probst | 192—113.1 X |
| 2,451,709 | 10/1948 | Baselet | 188—264 |
| 2,524,311 | 10/1950 | Fieux | 192—69 |
| 2,675,106 | 5/1954 | Foster | 192—113.1 |
| 3,215,233 | 11/1965 | Smith et al. | 192—48 |

FOREIGN PATENTS 1,113,195 11/1955 France.

BENJAMIN W. WYCHE III, *Primary Examiner.*